US006876984B2

(12) United States Patent
Tadayon et al.

(10) Patent No.: US 6,876,984 B2
(45) Date of Patent: Apr. 5, 2005

(54) METHOD AND APPARATUS FOR ESTABLISHING USAGE RIGHTS FOR DIGITAL CONTENT TO BE CREATED IN THE FUTURE

(75) Inventors: Bijan Tadayon, Germantown, MD (US); Aram Nahidipour, Mill Creek, WA (US); Xin Wang, Los Angeles, CA (US); Michael C. Raley, Downey, CA (US); Guillermo Lao, Torrance, CA (US); Thanh T. Ta, Huntington Beach, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 544 days.

(21) Appl. No.: 09/867,747

(22) Filed: May 31, 2001

(65) Prior Publication Data
US 2002/0184158 A1 Dec. 5, 2002

(51) Int. Cl.[7] .................................. G06F 17/60
(52) U.S. Cl. ..................... 705/51; 705/26; 713/182
(58) Field of Search ..................... 705/18, 20–23, 705/26–27, 50–59; 380/200–203; 713/182–186; 707/9–10, 100–104

(56) References Cited

U.S. PATENT DOCUMENTS

| 3,263,158 | A | 7/1966 | Janis |
| 3,609,697 | A | 9/1971 | Blevins et al. |
| 3,790,700 | A | 2/1974 | Callais et al. |
| 3,798,605 | A | 3/1974 | Feistel |
| 4,159,468 | A | 6/1979 | Barnes et al. |
| 4,220,991 | A | 9/1980 | Hamano et al. |
| 4,278,837 | A | 7/1981 | Best |
| 4,323,921 | A | 4/1982 | Guillou |
| 4,442,486 | A | 4/1984 | Mayer |
| 4,529,870 | A | 7/1985 | Chaum |
| 4,558,176 | A | 12/1985 | Arnold et al. |
| 4,593,376 | A | 6/1986 | Volk |
| 4,614,861 | A | 9/1986 | Pavlov et al. |
| 4,644,493 | A | 2/1987 | Chandra et al. |
| 4,658,093 | A | 4/1987 | Hellman |

(Continued)

FOREIGN PATENT DOCUMENTS

| EP | 0 084 441 | 7/1983 | |
| EP | 0 180 460 | 5/1986 | |
| EP | 0 332 707 | 9/1989 | |
| EP | 0 651 554 | 5/1995 | |
| EP | 0 668 695 | 8/1995 | |
| EP | 0 715 244 A1 | 6/1996 | |
| EP | 0 725 376 | 8/1996 | |
| EP | 1045388 A1 * | 10/2000 | ........... G11B/20/00 |
| GB | 2 136 175 | 9/1984 | |
| GB | 2 236 604 | 4/1991 | |

(Continued)

OTHER PUBLICATIONS

"Reciprocal and Advanced Marketing Services, Inc. Enter into an Agreement to Create a Secure Virtual Wholesaler for Digital Content", PR Newswire, Nov. 6, 2000.*

(Continued)

*Primary Examiner*—James P. Trammell
*Assistant Examiner*—Mary Cheung
(74) *Attorney, Agent, or Firm*—Marc S. Kaufman; Nixon Peabody, LLP

(57) ABSTRACT

Usage rights for a digital work are established prior to creation of the corresponding content. The rights can be associated with the content after the content is created. A content creation, such as a video recorder or a still camera, device can store labels of the rights and can associate usage rights with content in real time as the content is created.

25 Claims, 2 Drawing Sheets

U.S. PATENT DOCUMENTS

| | | |
|---|---|---|
| 4,713,753 A | 12/1987 | Beobert et al. |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,715,403 A | 2/1998 | Stefik |
| 5,729,741 A * | 3/1998 | Liaguno et al. .......... 707/104.1 |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,862,217 A | 1/1999 | Steinberg et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,953,419 A | 9/1999 | Lohstroh et al. |
| 5,982,891 A | 11/1999 | Ginter et al. |
| 5,999,949 A | 12/1999 | Crandall |
| 6,047,067 A | 4/2000 | Rosen |
| 6,112,181 A | 8/2000 | Shear et al. |
| 6,115,471 A | 9/2000 | Oki et al. |
| 6,138,119 A | 10/2000 | Hall et al. |
| 6,157,721 A | 12/2000 | Shear et al. |
| 6,169,976 B1 | 1/2001 | Colosso |
| 6,185,683 B1 | 2/2001 | Ginter et al. |
| 6,189,146 B1 | 2/2001 | Misra et al. |
| 6,216,112 B1 | 4/2001 | Fuller et al. |
| 6,219,652 B1 | 4/2001 | Carter et al. |
| 6,223,286 B1 | 4/2001 | Hashimoto |
| 6,226,618 B1 | 5/2001 | Downs et al. |
| 6,233,684 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,301,660 B1 | 10/2001 | Benson |
| 6,311,214 B1 * | 10/2001 | Rhoads ....................... 709/217 |
| 6,314,408 B1 | 11/2001 | Salas et al. |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,385,596 B1 * | 5/2002 | Wiser et al. .................. 705/51 |
| 6,389,402 B1 | 5/2002 | Ginter et al. |
| 6,574,609 B1 * | 6/2003 | Downs et al. ............... 705/50 |
| 6,581,161 B1 * | 6/2003 | Byford ....................... 713/182 |

FOREIGN PATENT DOCUMENTS

| | | |
|---|---|---|
| JP | 62-241061 | 10/1987 |
| JP | 64-068835 | 3/1989 |
| JP | 04-369068 | 12/1992 |
| JP | 05-268415 | 10/1993 |

| | | |
|---|---|---|
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/24186 | 6/1998 |
| WO | WO 98/42098 | 9/1998 |
| WO | WO 99/49615 | 9/1999 |
| WO | WO 00/01138 | 1/2000 |
| WO | WO 01/63528 | 8/2001 |

OTHER PUBLICATIONS

European Search Report dated Apr. 26, 2004.

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119–131, 1986, Comput. & Graphics, vol. 10, No. 2.

Mori, R. et al., "Superdistribution: The Concept and the Architecture", pp. 1133–1146, 1990, The Transactions of the IEICE, vol. E 73, No. 7, Tokyo, JP.

Weber, R., "Metering Technologies for Digital Intellectual Property", pp. 1–29, Oct. 1994, A Report to the International Federation of Reproduction Rights Organizations.

Clark, P.C. et al., "Bits: A Smartcard protected Operating System", pp. 66–70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1–19, Aug. 1992, Corporation for National Research Initiatives, Virginia.

Hilts, P. et al., "Books While U Wait", pp. 48–50, Jan. 3, 1994, Publishers Weekly.

Strattner, A, "Cash Register on a Chip may Revolutionize Software Pricing and Distribution; Wave Systems, Corp.", pp. 62, Apr. 1994, Computer Shopper, vol. 14, No. 4, ISSN 0886–0556.

O'Conner, M., "New Distribution Option for Electronic Publishers; iOpener Data Encryption and Metering System for CD–ROM use; Column", pp. 134, Mar. 1994, CD–ROM Professional, vol. 7, No. 2, ISSN: 1409–0833.

Willett, S., "Metered PCs: is Your System Watching You? Wave System beta tests new technology", pp. 84, May 2, 1994, InfoWorld.

Linn, R., "Copyright and Information Services in the Context of the National Research and Education Network", pp. 9–20, Jan. 1994, IMA Intellectual Property Project Proceedings, vol. 1, Issue 1.

Perrit, Jr., H., "Permission Headers and Contract Law", pp. 27–48, Jan. 1994, IMA Intellectual Property Project Proceedings, vol. 1, Issue 1.

Upthegrove, L., "Intellectual Property Header Descriptors: A Dynamic Approach", pp. 63–66, Jan. 1994, IMA Intellectual Property Proceedings, vol. 1, Issue 1.

Sirbu, M., "Internet Billing Service Design and prototype Implementation", pp. 67–80, Jan. 1994, IMA Intellectual Property Project Proceeings, vol. 1, Issue 1.

Simmel, S. et al., "Metering and Licensing of Resources: Kala's General Purpose Approach", pp. 81–110, Jan. 1994, IMA Intellectual Property Project Proceedings, vol. 1, Issue 1. Kahn, R., "Deposit, Registration and Recordation in an Electronic Copyright Management System", pp. 111–120, Jan. 1994, IMA Intellectual Property Project Proceedings, vol. 1, Issue 1.

Tygar, J. et al., "Dyad: A System for Using Physically Secure Coprocessors", pp. 121–152, Jan. 1994, IMA Intellectual Property Project Proceedings, vol. 1, Issue 1.

Griswold, G., "A Method for Protecting Copyright on Networks", pp. 169–178, Jan. 1994, IMA Intellectual Property Project Proceedings, vol. 1, Issue 1.

Nelson, T., "A Publishing and Royalty Model for Networked Documents", pp. 257–259, Jan. 1994, IMA Intellectual Property Project Proceedings, vol. 1, Issue 1.

Robinson, E., "Redefining Mobile Computing", pp. 238–240, 247–248 and 252, Jul. 1993, PC Computing.

Abadi, M. et al., "Authentication and Delegation with Smart–cards", 1990, Research Report DEC Systems, Research Center.

Mark Stefik, "Letting Loose the Light: Igniting Commerce in Electronic Publication", pp. 219–253, 1996, Internet Dreams: Archetypes, Myths, and Metaphors, IDSN 0–262–19373–6.

Mark Stefik, "Letting Loose the Light: Igniting Commerce in Electronic Publication", pp. 2–35, Feb. 8, 1995, Internet Dreams: Archetypes, Myths and Metaphors.

Henry H. Perritt, Jr., "Technological Strategies for Protecting Intellectual Property in the Networked Multmedia Environment", Apr. 2–3, 1993, Knowbots, Permissions Headers & Contract Law PCT International Search Report for PCT/US02/17851 dated Oct. 3, 2002 (5 pages).

PCT International Search Report for PCT/US02/15201 dated Feb. 13, 2003 (3 pages).

* cited by examiner

METHOD AND APPARATUS FOR ESTABLISHING USAGE RIGHTS FOR DIGITAL CONTENT TO BE CREATED IN THE FUTURE

RELATED APPLICATION DATA

This application is related to Applicants' patent applications entitled METHOD AND APPARATUS FOR TRANSFERRING USAGE RIGHTS AND DIGITAL WORK HAVING TRANSFERRABLE USAGE RIGHTS (application Ser. No. 09/867,746) DEMARCATED DIGITAL CONTENT AND METHOD FOR CREATING AND PROCESSING DEMARCATED DIGITAL WORKS (application Ser. No. 09/867,754) METHOD AND APPARATUS FOR DYNAMICALLY ASSIGNING USAGE RIGHTS TO DIGITAL WORKS (application Ser. No. 09/867,754) METHOD AND APPARATUS FOR ASSIGNING CONDITIONAL OR CONSEQUENTIAL RIGHTS TO DOCUMENTS AND DOCUMENTS HAVING SUCH RIGHTS (application Ser. No. 09/867,749) and METHOD AND APPARATUS FOR HIERARCHICAL ASSIGNMENT OF RIGHTS TO DOCUMENTS AND DOCUMENTS HAVING SUCH RIGHTS (application Ser. No. 09/867,749), which are being filed concurrently herewith, and are incorporated herein by reference in their entirety.

BACKGROUND OF THE INVENTION

This invention relates generally to assignment of usage rights for digital works. In particular, this invention relates to establishing usage rights for before the content is created.

One of the most important issues impeding the widespread distribution of digital works via electronic means, and the Internet in particular, is the current lack of protection of intellectual property rights of content owners during the distribution and the usage of the digital content. Efforts to resolve these issues have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management" ("DRM") herein.

Due to the expansion of the Internet in the recent years, and the issues relating to privacy, authentication, authorization, accounting, payment and financial clearing, rights specification, rights verification, rights enforcement, document protection, and collection of licensing fees DRM has become even more important. Because the Internet is such a widely used network whereby many computer users communicate and trade ideas and information, the freedom at which electronically published works are reproduced and distributed is widespread and commonplace.

Two basic types DRM of schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPES™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. Nos. 5,530,235, 5,634,012;, 5,715,403, 5,638,443, and 5,629,980 introduced many basic concept of DRM. All of these patents are hereby incorporated herein by reference in their entirety. U.S. Pat. No. 5,634,012 discloses a system for controlling the distribution of digital documents. Each rendering device has a repository associated therewith. A predetermined set of usage transaction steps define a protocol used by the repositories for carrying out usage rights associated with a document. Usage rights are encapsulated with the content or otherwise associated with the digital work to travel with the content. The usage rights can permit various types of use such as, viewing only, use once, distribution, and the like. Rights can be granted based on payment or other conditions.

In conventional DRM techniques, a content owner, or other authorized party, specifies the rights after the content has been created and protects, e.g. encrypts, the content at the same time. A private key is used to encrypt the content, and a label is generated which specifies the usage rights. The rights label and the protected content are then associated and stored. A license to the content can later be generated for a user to permit the user to use or access the content. The license includes a private key which has been encrypted using a public key in known manner.

To access the content, the private key can be used to decrypt the encrypted public key, allowing the user to decrypt the content. This technique works well if the content is available at the time of the rights specification. However, this technique breaks-down if one wants to specify rights for content and issue a license for the content before the content is available. For example, a distributor of streaming video to a live future event, or of photographs to a future event, may want to begin selling licenses to the content prior to the event. Conventional DRM systems fall short of presenting processes for improving the security, user interface, organization, structure, and accuracy of the DRM system, particularly for those works that are not yet in existence.

SUMMARY OF THE INVENTION

An object of the invention is to obviate the problems noted above in the prior technology and permit usage rights to be assigned to a work prior to creation of the work.

A first aspect of the invention is a method for creating a digital work having content and usage rights related to the content. The method comprises generating a label having usage rights associated with content of a digital work before the content is created, associating the label with the content after the content is created, and securing the content and the label.

A second aspect of the invention is a system for providing usage rights for a digital work. The system comprises a content creation device for creating a digital content, a rights assignment engine associated with the content creation device, the rights assignment engine automatically attaching predetermined usage rights to the created digital content, and an identification device for identifying an authorized user and allowing the authorized user to gain access to the digital content in accordance with the usage rights.

A third aspect of the invention is a method for creating a digital work having content and usage rights related to the content. The method comprises generating a label having usage rights associated with content of a digital work before the content is created, storing the label in a content creation device, creating content with the content creation device, associating the label with the content after the content is created, and securing the content and the label.

BRIEF DESCRIPTION OF THE DRAWING

Various embodiments of this invention will be described in detail, with reference to the following figures, wherein.

DETAILED DESCRIPTION

The phrase "digital work" as used herein refers to any type of element having content in computed readable form. "Content" as used herein refers to the viewable or otherwise usable portion of a digital work. The phrase "usage rights" refers to permissions granted to a user of an existing digital work or a digital work to be created in the future with respect to use, access, distribution, and the like of the content of the work. In addition, usage rights may have one or more conditions which must be satisfied before the permissions may be exercised.

Figure 1:
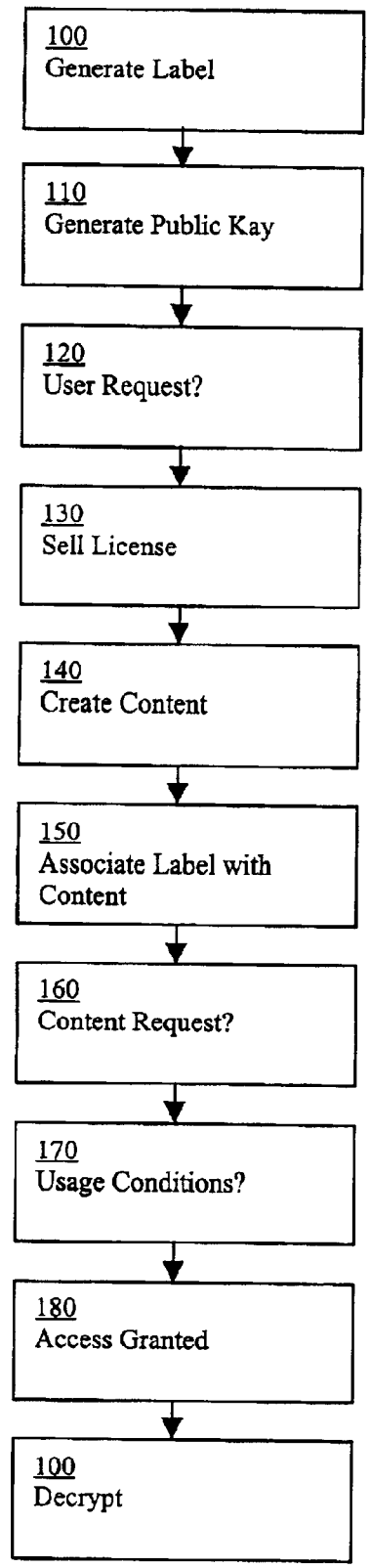
FIG. 1 is a flowchart of a method for providing usage rights for digital content before creation of the content in accordance with the an embodiment of the invention.

FIG. 1 illustrates an embodiment of a method for providing usage rights for content of a digital work before the content is created. In step 100 a label specifying usage rights, to be associated with digital content that is not yet created, is generated. The usage rights label can include usage rights, such as the right to print, copy, alter, edit or view the digital work or any other right, permission, or restriction, such as those contained in the XrML™ language or other usage rights grammar. Alternatively, the usage rights label may include merely an identification of the work and other descriptive data and the specific granted usage rights can be contained in the license discussed below. In the case of using the XrML™ language, the label can be an extensible markup language (XML) document specifying the usage rights. In addition, the future content can have many different versions of usage rights and thus a label can be generated for each version. In step 110, a key, such as a conventional public key, is generated in a known manner and associated with the label.

In step 120, a user request for use of, i.e. a license to, the content to be created is received. Keep in mind that the content itself need not be in existence yet. For example, the content can be a video recording or stream of a sporting event to occur in the future. In step 130, a distributor of the content, or another authorized party, issues a license to the user. The license can include a private key corresponding to the public key generated in step 110 and may include usage rights or other descriptive data. Once, again, keep in mind that the content itself need not be in existence yet. Accordingly, the distributor is able to sell a license to view the event prior to the event.

In step 140, the content is created. Of course, this step can be accomplished by another party. However the content is created, the salient point is that the content somehow comes into existence after rights are assigned for it. After the content is created, the usage rights label is associated with the content in step 150. The usage rights label can be encapsulated with or attached to the content whereby copies of the digital work will also carry the usage rights label. Alternatively, the label can be stored separately from the content but be associated through flags, calls, or the like. Therefore, the term "associated" as used herein refers broadly to creating a correspondence between the content and the label so the label will be applied to the content. Once the usage rights label is associated with the content, the content is secured using the key generated in step 110. The digital content can be secured through any form of encryption or other known technique. For example pretty good privacy (PGP) encryption procedures can be used.

In step 160, the process determines whether there is a request for access to the secured digital content. If there are no requests, the process waits for a request. However, if there is a request for access, the process proceeds to step 170 where the usage rights associated with the digital work and/or license are checked to determine whether all the conditions, such as payment, associated with the usage rights have been satisfied. If all the conditions have been satisfied, the process proceeds to step 180 in which access to the content is granted, i.e., the content is downloaded, streamed, or otherwise transferred to the user. In step 190, the user's private key is used to decrypt the content in a known manner.

The association of the usage rights with the content may occur in a variety of ways. For example, if the usage rights will be the same for the entire content of a digital work, the usage rights can be attached when the digital work is processed for deposit in a distribution server of other device. However, if the content of the digital work has a variety of different usage rights for various components, the usage rights can be attached as the work is being created. Various authoring tools and/or digital work assembling tools can be utilized for providing an automated process of attaching the usage rights. Because each part of a digital work can have its own usage rights, there can be instances where the usage rights of a "part" will be different from its parent. As such, conflict rules can be established to dictate when and how a right may be exercised.

Figure 2:
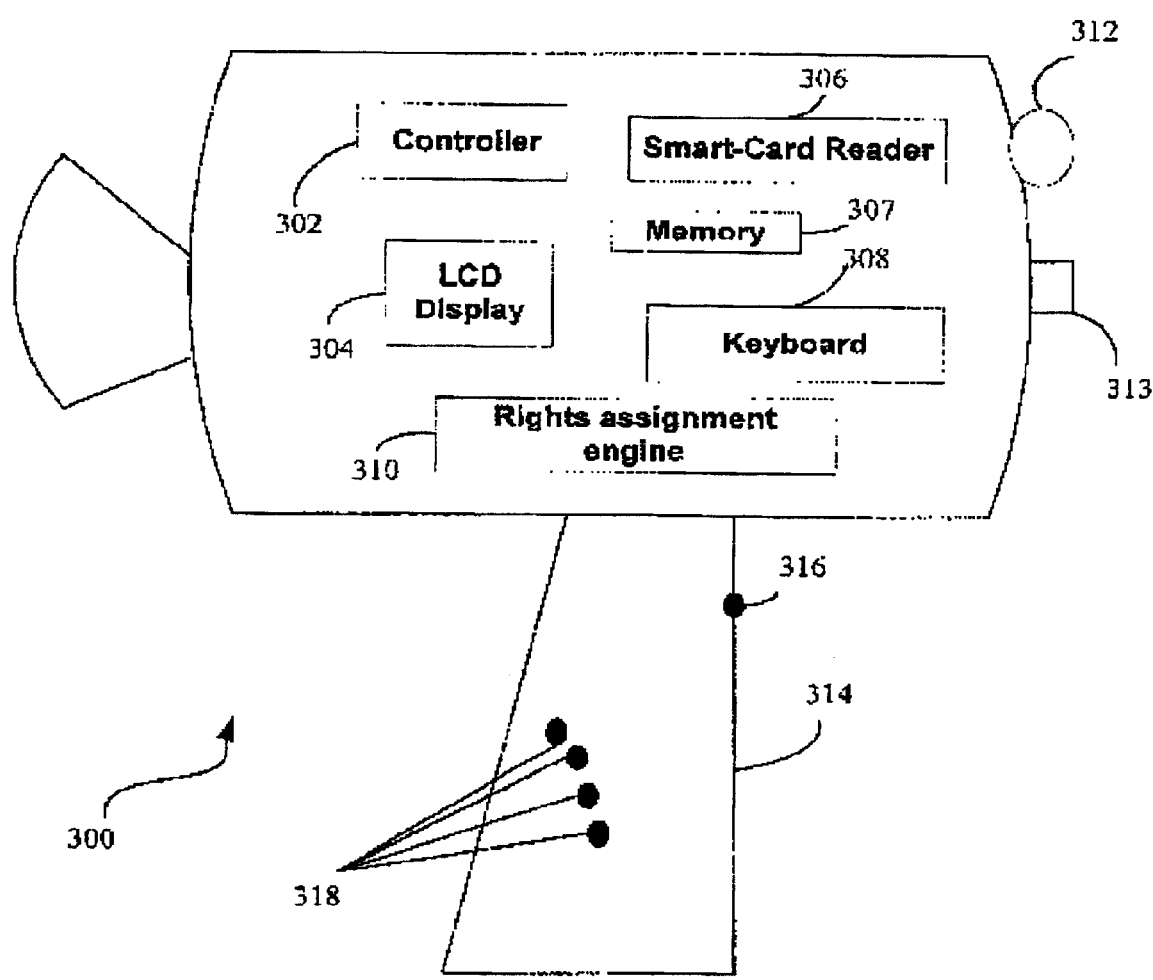
FIG. 2 is a content creation device for providing usage rights for digital content to be created in the future in accordance with an embodiment of the invention.

FIG. 2 illustrates a content creation device, a video recorder, in accordance with a preferred embodiment of the invention. The content creation device 300 includes a controller 302, a LCD display 304, a smart-card reader 306, a memory 307, a keypad 308, a rights assignment engine 310, eye/iris recognition sensors 312, a cable connection 313, a handle 314, and symmetric finger print recognition sensors 316,318. Also, lens system 320 permits recording of video images. Controller 302 and rights assignment engine 310 of the preferred embodiment are accomplished through a microprocessor based device programmed in a desired manner.

While FIG. 2 shows the controller 302 and the rights assignment engine 310 as separate units, the functions performed by these units may be combined in one processor or may be further divided among plural processors such as digital signal processors and/or performed by dedicated hardware such as application specific integrated circuits (ASIC), e.g., hardwired electronic or logic circuits or programmable logic devices., or other hardware or software implementations.

The smart-card reader 306 can be used for reading cards inserted therein. For example, a license, usage rights, or identification can be embedded in the card and communicated to the controller 302 and/or the rights assignment engine 310. LCD display 304, the smart card reader 306, keypad 308 and software interfaces constitute a user interface of creation server 300. The user interface permits a user to input information such as identification data, and access requests and provides feedback as to operation of creation device 300. The content creation device 300 of the preferred embodiment is a video recorder, however, it can be any type of recording device, for example, a still-image camera, an animation generator, or an audio recorder.

The rights assignment engine 310 can be accessed via the cable connection 313. For example, a rights assignment computer (not illustrated), such as any computer running XrML™ and related tools, can be coupled to the rights assignment engine 310 via cable connection 313 to download a usage rights label or template, similar to the label described above, indicating usage rights for content to be created by the content creation device 300 in the future. Any content created by the content creation device 300 will automatically be associated with the usage rights label or labels stored in rights assignment engine 310. Alternatively, the usage rights label can be composed using the user interface of creation device 300. In either case, one or more labels are and corresponding keys generated and stored in rights assignment engine 310 along with instructions indicating how the labels are to be assigned to content recorded by creation device. 300.

The instructions can cause the usage rights labels to be assigned in any manner and can include any permissions and/or restrictions. For example, in the case of a video recorder, each part of the video sequence or frames can selectively be assigned different rights. This makes the rights assignment process very flexible and dynamic and permits rights assignment to be made in real time as content is created or prior to creation.

The content creation device 300 can utilize a unique device ID, a user's smart card, PKI technology, a PIN, or any biometrics system to assign rights based on the identity of the user, the recording device itself, the data on the smart card, or the like. For example, fingerprint recognition sensors 316, 318 or iris recognition sensor 312 can be used for recognition or authentication of the user's identify to permit rights assignment engine 310 to use a corresponding set of rights associated with the user. For example, all content recorded by person A will have one set of rights and all content recorded by person B will have a different set of rights.

The content creation device 300 records content in a conventional manner. However, labels and keys generated in steps 100 and 110 described above are stored and associated with content recorded by content recorder 300 during or soon after recording. Accordingly, steps 140 and 150 described above are also accomplished by content creation device 300. For security purposes, a token or pre-paid card (or magnetic card and smart card, or any of its variations, such as memory-type or synchronous communication card, ISO 7816-compliant card, EMV-type card) can be used for the storage of fees and micro-payments, or keeping track of those fees with associated rights. Such cards can be read using the smart card reader 306.

It can be seen that the invention permits usage rights for a work to be created and associated with content prior to the creation of the content. The usage rights define how the future digital work may be used and distributed. These pre-established usage rights become apart of the future digital work and controls the usage and distribution of the content of such work.

In the preferred embodiment, after the rights have been established for a future content, a private key associated with the future content is assigned and a rights label is generated. This private key, along with the rights label, is stored. A user can purchase the content (present or future) after the label has been inserted into the main server. After the content is purchased, the content owner can get a license for encryption which contains the public key encrypted by a private key. Alternatively, a single symmetric key can be used.

The invention can be used in a subscription model (for example, for magazine or marketing reports) in which the future issues of the content have not been published, but the rights for those issues have already been assigned and stored. At an appropriate future time, the rights will be associated with the corresponding content. For example, by selling the content of a future event on a web site before the actual event, the traffic of the Web site can be drastically reduced and distributed over a longer period of time, making the requirements for the servers and the Web site easier to satisfy and less expensive to operate. Note, however, that the Web site selling the rights or tickets, i.e. the license, might be different from the Web site providing the content later on.

Also, the invention allows a newspaper editor, for example, to send a camera crew to record content without worrying about the pictures being compromised in any way (for example, altered, edited, viewed by unauthorized personnel, or hidden and separately sold to another newspaper organization). In fact, the camera crew may have no rights whatsoever in the content as soon as the content is recorded.

Alternatively the editor can set the rights in such a way that the first 10 pictures, for example, will belong to the newspaper (work-related), and the next five pictures will belong to the cameraman (for personal use). This example illustrates the flexibility, security, confidence, certainty, and multiple relationships that can be arranged between parties (the cameraman and the editor in this example).

All future content may be assigned a content ID prior to existence of the content. Given the content ID information and the license for encryption, the content can be encrypted after creation in a manner that is available to be used by the users who have purchased the license. However, if the content ID information and the license for encryption are not available, access to the content shall be denied.

Further, a predetermined symmetric key can be generated in advance of content creation, and stored with the rights label. Afterwards, the same key can be used to encrypt the content once it is created. However, as noted above every user can receive a different key. In another alternative, the user can be given an authorization token, which the user can exchange for the license later on.

The controller 302 can process the security parameters and the rights management steps. Lost-card verification, lost-card reports, card-usage reports, security alert reports, and tracking reports can be associated or combined with the rights management reports, such as reports for revoked rights, denied rights, renewed rights, usage patterns, and micro-payments.

The invention may be readily implemented in software using object or object-oriented software development environment that provides portable source code that can be used on a variety of computer hardware platforms. For example the software can be written in the JAVA™ language and run in a JAVA™ virtual machine. Alternatively, the disclosed operations may be implemented partially or fully in a hardware using standard logic circuits or VLSI designs. The hardware can include any type of general purpose computer, dedicated computer, or other devices.

The distribution, accounting, and other functions of the distributor and clearinghouse can be accomplished by any party on any device. For example, the content can be rendered on an ebook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

The invention has been described in connection with the above embodiments. However, it should be appreciated that many alternates, modifications and variations may be made to the embodiments of the invention without departing from the scope of the invention as defined by the appended claims and legal equivalents.

What is claimed is:

1. A method for creating a digital work having content and usage rights related to the content, the digital work being adapted to be used within a system having repositories for controlling use of content, the method comprising:
   generating a label having usage rights associated with content of a digital work before the content is created, the usage rights specifying a type of use of the content that is enforceable by a repository;
   electronically generating a license based on the label before the content is created;
   issuing the license to a consumer before the content is created, the license entitling the consumer to access the content after the content is created;
   associating the label with the content after the content is created; and
   securing the content and the label to thereby create a digital work having content that can be used only in accordance with the usage rights.

2. The method of claim 1, wherein said securing step comprises encrypting and storing the content and the label.

3. The method of claim 1, further comprising granting access to the content in accordance with the usage rights.

4. The method of claim 1, wherein said generating step comprises generating usage rights specifying a user's right to at least one of alter, edit, copy, print, or view the content.

5. The method of claim 1, further comprising the step of creating at least one of a written, aural, graphical, audio, pictorial or video based element as the content after said generating step and before said associating step.

6. A method of claim 5, wherein said creating step comprises recording content with a recording device and wherein said associating step and said securing step are accomplished by the recording device.

7. A method as recited in claim 6, wherein said generating step comprises creating the label in an external computing device and downloading the label into the recording device prior to said associating step.

8. A method as recited in claim 6, wherein said generating step comprises creating the label in the recording device prior to said associating step.

9. The method of claim 1, wherein said generating step further comprises:
   assigning a predetermined secure key to be associated with the content and wherein said securing step comprises encrypting the content and the label with the secure key.

10. A system for creating a digital work having content and usage rights, the system comprising:
    a content creation device for creating a digital content; and
    a rights assignment engine associated with the content creation device, the rights assignment engine automatically attaching predetermined usage rights to the content and securing the content with the usage rights, and receiving a label including the usage rights before the content is created, the usage rights specifying a type of use of the content that is enforceable by the content creation device;
    wherein a license based on the label is generated before the content is created and is issued to a consumer before the content is created, the license entitling the consumer to access the content after the content is created, and
    the rights assignment engine associates the label with the content after the content is created, and secures the content and the label to thereby create a digital work having content that can be used only in accordance with the usage rights.

11. A system as recited in claim 10, further comprising:
    identification device for identifying user of the content creation device; and means for determining the usage rights based on the user.

12. The system of claim 11, wherein the identification device comprises, a biometrics sensor.

13. The system of claim 11, further comprising a secure storage medium for the storage of fee and payment information associated with the usage rights.

14. The system of claim 11, wherein said content creation device comprises a video recorder.

15. The system of claim 11, wherein said content creation device comprises a still picture camera.

16. The system of claim 10 wherein said content creation device comprises one of a still-image camera, an audio recorder, or a video recorder.

17. A method for creating a digital work having content and usage rights related to the content, the digital work being adapted to be used within a system having repositories for controlling use of content, the method comprising:
    generating a label having usage rights associated with content of a digital work before the content is created, the usage rights specifying a type of use of the content that is enforceable by a repository;

storing the label in a content creation device;

electronically generating a license based on the label before the content is created;

issuing the license to a consumer before the content is created, the license entitling the consumer to access the content after the content is created;

creating the content with the content creation device;

associating the label with the content after the content is created; and securing the content and the label to thereby create a digital work having content that can be used only in accordance with the usage rights.

18. The method of claim 17, wherein said securing step comprises encrypting and storing the content and the label.

19. The method of claim 17, further comprising granting access to the content in accordance with the usage rights.

20. The method of claim 17, wherein said generating step comprises generating usage rights specifying a user's right to at least one of alter, edit, copy, print, or view the content.

21. The method of claim 17, wherein said creating step comprises creating at least one of a written, aural, graphical, audio, pictorial or video based element as the content.

22. The method of claim 17, wherein said generating step further comprises:

assigning a predetermined secure key to be associated with the content and wherein said securing step comprises encrypting the content and the label with the secure key.

23. A method of claim 22 wherein said creating step comprises making a recording with a recording device and wherein said associating step and said securing step are accomplished by the recording device.

24. A method as recited in claim 23, wherein said generating step comprises creating the label in a computing device and downloading the label into the recording device prior to said associating step.

25. A method as recited in claim 23, wherein said generating step comprises creating the label in the recording device prior to said associating step.

* * * * *